(12) United States Patent
Bronicki et al.

(10) Patent No.: US 6,422,019 B1
(45) Date of Patent: Jul. 23, 2002

(54) APPARATUS FOR AUGMENTING POWER PRODUCED FROM GAS TURBINES

(75) Inventors: Lucien Y. Bronicki, Yavne; Yoel Gilon, Jerusalem; Joseph Sinai, Ramat Gan; Uriel Fisher, Haifa; Shlomo Bugdagzad, Reshon Lezeon, all of (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 10/023,837

(22) Filed: Dec. 21, 2001

Related U.S. Application Data

(60) Division of application No. 09/664,518, filed on Sep. 18, 2000, now Pat. No. 6,332,321, which is a division of application No. 08/764,337, filed on Dec. 12, 1996, now Pat. No. 6,119,445, which is a continuation of application No. 08/275,371, filed on Jul. 15, 1994, now abandoned, which is a continuation-in-part of application No. 08/095,027, filed on Jul. 22, 1993, now abandoned, and a continuation-in-part of application No. 07/973,612, filed on Nov. 9, 1992, now abandoned.

(51) Int. Cl.[7] ............................................... F02C 7/143
(52) U.S. Cl. ............................................................ 60/728
(58) Field of Search ................................ 60/39.53, 726, 60/728; 415/179

(56) References Cited

U.S. PATENT DOCUMENTS 3,796,045 A * 3/1974 Foster-Pegg .................. 60/772
5,655,373 A * 8/1997 Yamashita et al. ............ 60/728
6,012,279 A * 1/2000 Hines ........................... 60/728

* cited by examiner

Primary Examiner—Louis J. Casaregola
(74) Attorney, Agent, or Firm—Nath & Associates PLLC; Gary M. Nath; Jerald L. Meyer

(57) ABSTRACT

The power produced by a gas turbine system is augmented by a direct contact heat exchanger for contacting and cooling humid ambient air with cooler water for producing cooled ambient air and warmed water, and a precompressor device for compressing said cooled ambient air to produce pressurized air that is warmer than ambient air and has a lower relative humidity. An evaporative cooler, which is supplied with the warmed water, is provided for cooling said pressurized air to produce cooled pressurized air at about ambient air temperature and relative humidity, which is supplied to the main compressor.

4 Claims, 13 Drawing Sheets

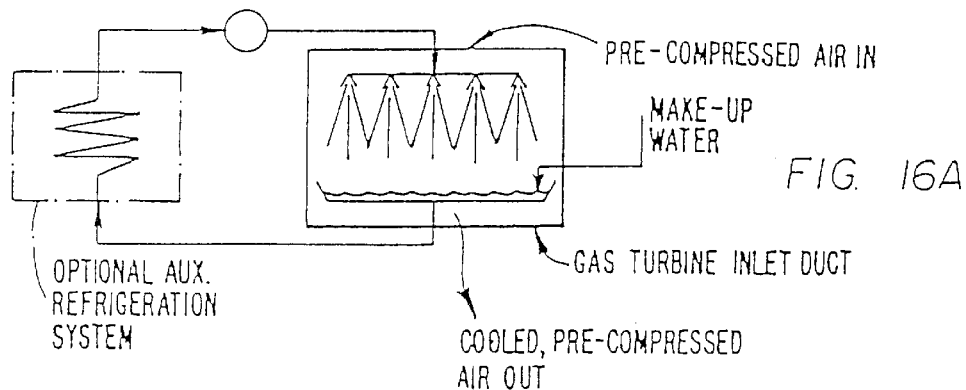
FIG. 16A
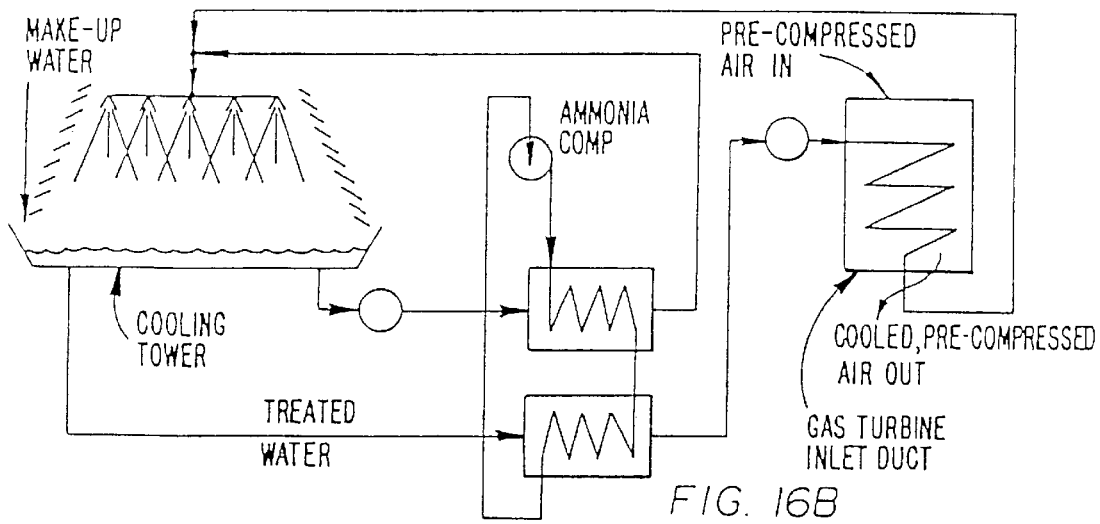
FIG. 16B
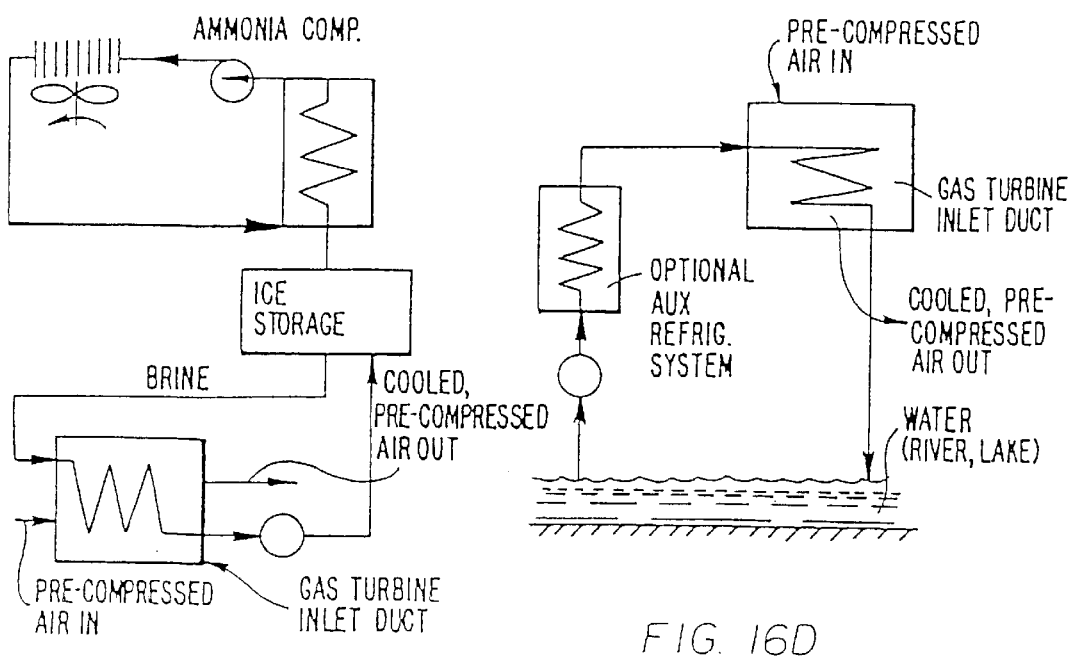
FIG. 16C
FIG. 16D

APPARATUS FOR AUGMENTING POWER PRODUCED FROM GAS TURBINES

RELATED APPLICATION

This application is a Divisional of patent application Ser. No. 09/664,518 filed Sep. 18, 2000, now U.S. Pat. No. 6,332,321, which is a divisional of patent application Ser. No. 08/764,337 filed Dec. 12, 1996, now U.S. Pat. No. 6,119,445 which is a continuation of prior application Ser. No. 08/275,371 filed Jul. 15, 1994, now abandoned, which is a continuation in part of prior application Ser. No. 08/095,027 filed Jul. 22, 1993, now abandoned, and Ser. No. 07/973,612 filed Nov. 9, 1992, now abandoned, the entire contents of which are hereby incorporated in their entirety.

BACKGROUND OF THE INVENTION

1. Field of the Invention

The present invention relates to a method of and apparatus for augmenting power produced from gas turbines, and more particularly, to a method of and apparatus for augmenting power produced from gas turbines in a combined cycle ground-based power plant.

2. Background Art

A combined cycle power plant is one in which the exhaust gases produced by a gas turbine are used to operate a steam boiler that produces steam supplied to a steam turbine. The power produced by such a combined cycle power plant is the sum of the outputs of the generators driven by the respective turbines. It is conventional to increase the work produced by the gas turbine by reducing the turbine inlet temperature, and by increasing the turbine inlet pressure. In the American Society of Mechanical Engineers Paper No. 65-GTP-8 (1965) by R. W. Foster-Pegg, the author describes supercharging a gas turbine (i.e., increasing the inlet pressure) by using a forced draft fan in order to increase the power output of the, turbine. The detrimental effect on the power output of the gas turbine due to the increase in inlet air temperature resulting from the fan operation is compensated for by spraying water into the air leaving the fan and before the air is applied to the turbine to bring about cooling of this air. The ambient air temperature and humidity control the effect this expedient has on the increase in power output of the turbine. Under hot, humid conditions, this technique has not proved to be effective.

In addition, gas turbines produce reduced work at high ambient temperatures due to a reduction in the mass flow of air through the system. Such high ambient temperatures, in a combined cycle utilizing a steam turbine operating on steam generated by the exhaust gases of the turbine, furthermore cause a reduction in the mass flow of exhaust gases thus reducing the work produced by the steam turbine. Even so, the effect on steam turbine performance will be partially compensated for, under high ambient temperature conditions, when water cooled condensers are used, because of the increased exhaust gas temperature. However, when air cooled condensers are utilized, high ambient temperatures will have a detrimental effect. In such case, the work produced by the steam turbine is reduced due to the lower mass flow on the gases exiting the turbine, is recovered somewhat due to the higher temperature of the gases, but is further reduced due to the higher condensing pressure prevailing in the air cooled condenser.

U.S. Pat. No. 3,796,045 discloses a gas turbine power plant in which air supplied to the compressor of the gas turbine is first passed through a motor driven fan that pressurizes the supplied air, and then through a deep-chiller which may be a conventional compression-type refrigeration unit. The net power developed as a result of this approach exceeds the net power of a gas turbine power plant without precompression and deep chilling. In another embodiment shown in the 1045 patent, a waste heat converter is provided for utilizing the heat in the exhaust gases of the gas turbine to drive the fan and the deep chiller.

Pending U.S. Pat. application Ser. No. 07/818,123 filed Jan. 8, 1992, discloses an improved chiller for deep chilling the air supply to a gas turbine. The term "deep chilling" is used in this specification to mean chilling ambient air to a temperature significantly below ambient air temperature. Specifically, deep chilling refers to chilling the air to the minimum temperature considered suitable for inlet chilling in a ground-based gas turbine based power plant of the type conventionally used by utilities for supplying power to an electrical grid. Such temperature is usually about 45° F. (10° C.) to avoid ice-built up in the blades of the main compressor driven by the gas turbine taking into account a drop of about 10° F. (5° C.) in the static air temperature in the compressor inlet, and a 3° F. (2° C.) safety margin.

Deep chilling at installations where the relative humidity is high is not cost effective. For example, deep chillers, and evaporative chillers as well, are not used in Florida, or other humid locations on the east coast of the United States, but are very common in dry areas of California.

It is therefore an object of the present invention to provide a new and improved method of and an apparatus for augmenting power produced from gas turbines by providing a new and improved technique for precompressing and cooling hot, precompressed ambient air.

BRIEF DESCRIPTION OF THE INVENTION

The invention provides for augmenting the power produced by a gas. turbine system of the type having a main compressor for compressing ambient air supplied to the compressor to produce compressed air, a combustor for heating the compressed air and producing hot gases, and a gas turbine responsive to the hot gases for driving the main compressor and. supplying a load, and for producing hot exhaust gases. According to the present invention, power augmentation is provided for by utilizing a direct contact heat exchanger for contacting and cooling humid ambient air with cooler water for producing cooled ambient air and warmed water, and a precompressor device for compressing the cooled ambient air to produce pressurized air that is warmer than ambient air and has a lower relative humidity. An evaporative cooler, which is supplied with the warmed water, is provided for cooling said pressurized air to produce cooled pressurized air at about ambient air temperature and relative humidity, which is supplied to the main compressor.

BRIEF DESCRIPTION OF THE DRAWINGS

Embodiments of the present invention are described by way of example and with reference to the accompanying drawings wherein:

FIG. 5 shows an embodiment of a cooler used in the present invention including an embodiment of a controller for controlling the level of cooling achieved by the cooler;

FIGS. 16A–D illustrates various embodiments for cooling pre-compressed air before the air is supplied to the compressor inlet of a gas turbine system.

DETAILED DESCRIPTION

Figure 1:
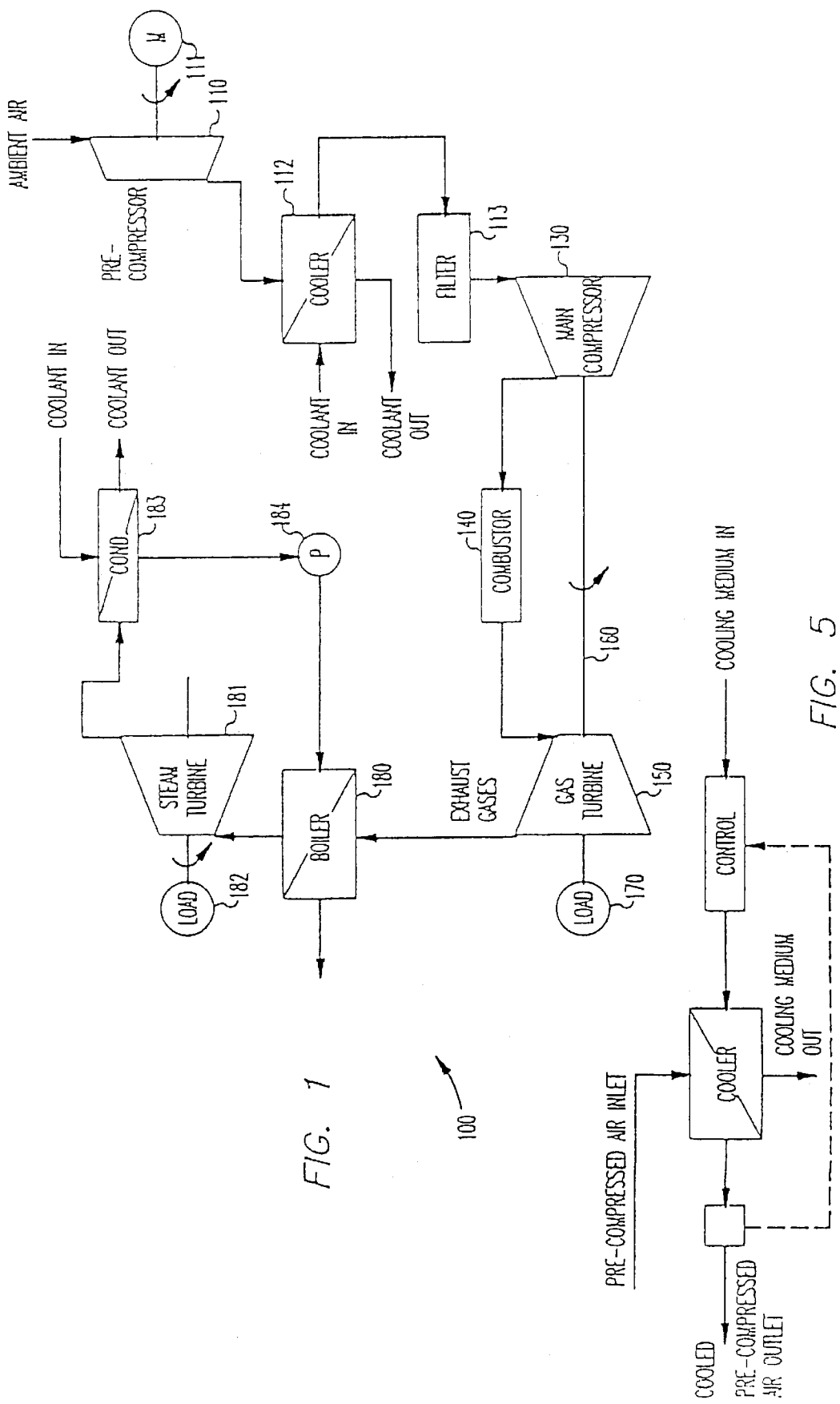
FIG. 1 is a block diagram, in schematic form, of one embodiment of the present invention showing a combined cycle that utilizes precompression and cooling.

Referring now to the drawings, reference numeral 100 designates the first embodiment of the present invention comprising a ground-based, combined-cycle power plant having main compressor 130 for compressing ambient air supplied to the compressor to produce compressed air, combustor 140 for heating the compressed air and producing hot gases, and gas turbine 150 responsive to the hot gases for driving the main compressor through interconnecting shaft 160, and for supplying load 170 which, typically, is in the form of an electrical generator. Turbine 150 produces hot exhaust gases which are directed to boiler 180 containing water that is evaporated into steam by the exhaust gases which are then vented to the ambient atmosphere, usually through a, muffler (not shown). The steam is applied to steam turbine 181 where expansion takes place producing work that is supplied to load 182. The steam exhausted from the turbine after work has been produced is condensed in condenser 183 producing condensate that is returned to the boiler by. pump 184 to repeat the cycle.

Compressed air for main compressor 130 is supplied by precompressor 110 driven by motor 111. The compressed air, having been heated by the compression process, is applied to cooler 112 which cools the air reducing its temperature to about ambient temperature. The cooler can be part of a mechanical refrigeration system (not shown) that provides refrigerant to the cooler. However, according to the present invention, the preferred cooler is an evaporative cooler. Furthermore, preferably, the cooled, compressed air is passed through filter 113 before being supplied to main compressor 130. A centrifugal or cyclone filter is preferred.

Figure 2:
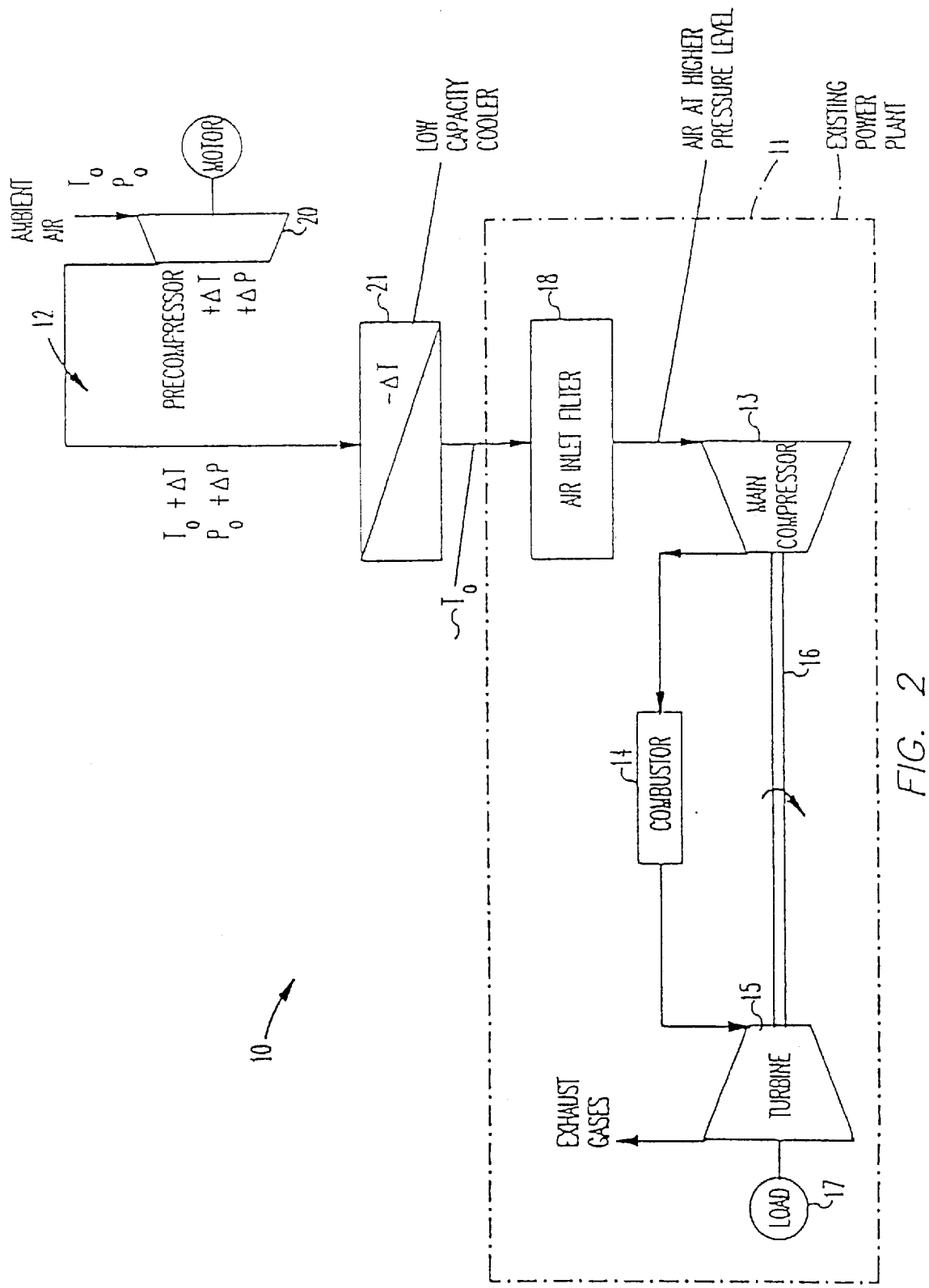
FIG. 2 is a block diagram, in schematic form, of another embodiment of the present invention showing low capacity precompressing and cooling utilizing an externally driven power source.

FIG. 2 shows a second embodiment of the present invention wherein reference numeral 10 designates a power plant comprising a conventional power plant 11 to which low capacity precompression and cooling is applied by apparatus 12. Power plant 11 represents a large-scale, ground-based, power plant conventionally used to supply power to an electrical grid. Plant 11 comprises main compressor 13 for compressing. ambient air supplied to the compressor to produce compressed air, combustor 14 for heating the compressed air and producing hot gases, and gas turbine 15 responsive to the hot gases for driving the main compressor through interconnecting shaft 16, and for driving load 17 which, typically, is in the form of an electrical generator. Turbine 15 produces hot exhaust gases which usually are vented into the ambient air through a muffler system (not shown).

In large ground-based installations used by utilities for generating power that is supplied to an electrical grid, filter device 18 is an integral part of the air supply system to main compressor 13, and is necessary in order to protect the compressor from entrained particles, that could damage the blading of the compressor. Filter device 18 introduces a pressure drop in the air supplied to the main. compressor. As a consequence, the pressure of the air at the inlet to compressor 13 will be below the pressure of the air at the inlet to filter device 18.

The pressure developed by precompressor. device 20 can be used to at least compensate for the pressure drop through the filter. Device 20 compresses ambient air applied to the main compressor thereby introducing both temperature and pressure rises in the supplied air. The term "supplied air", as used in this specification, refers to air supplied through the main compressor.

As shown in FIG. 2, the temperature and pressure rise in the precompressor device is designated by +del T and +del P. Precompressor device 20.is constructed and arranged such that the pressure rise introduced by the device is at least greater in size than to the pressure drop introduced by filter device 18. However, in accordance with the present invention, pressure of the air applied to main compressor 13 will be greater than ambient air pressure.

Interposed between precompressor device 20 and inlet air filter 18 is low capacity cooler 21 which introduces a temperature drop of about –del T into the air supplied to the compressor. The design of cooler 21 is such that the temperature introduced by the cooler is substantially comparable in size to the temperature rise introduced by precompressor device 20. As a consequence of cooler 21, the temperature of the air entering main compressor 13 usually is substantially close to ambient temperature. Also here, according to the present invention, the preferred cooler is an evaporative cooler.

Figure 3:
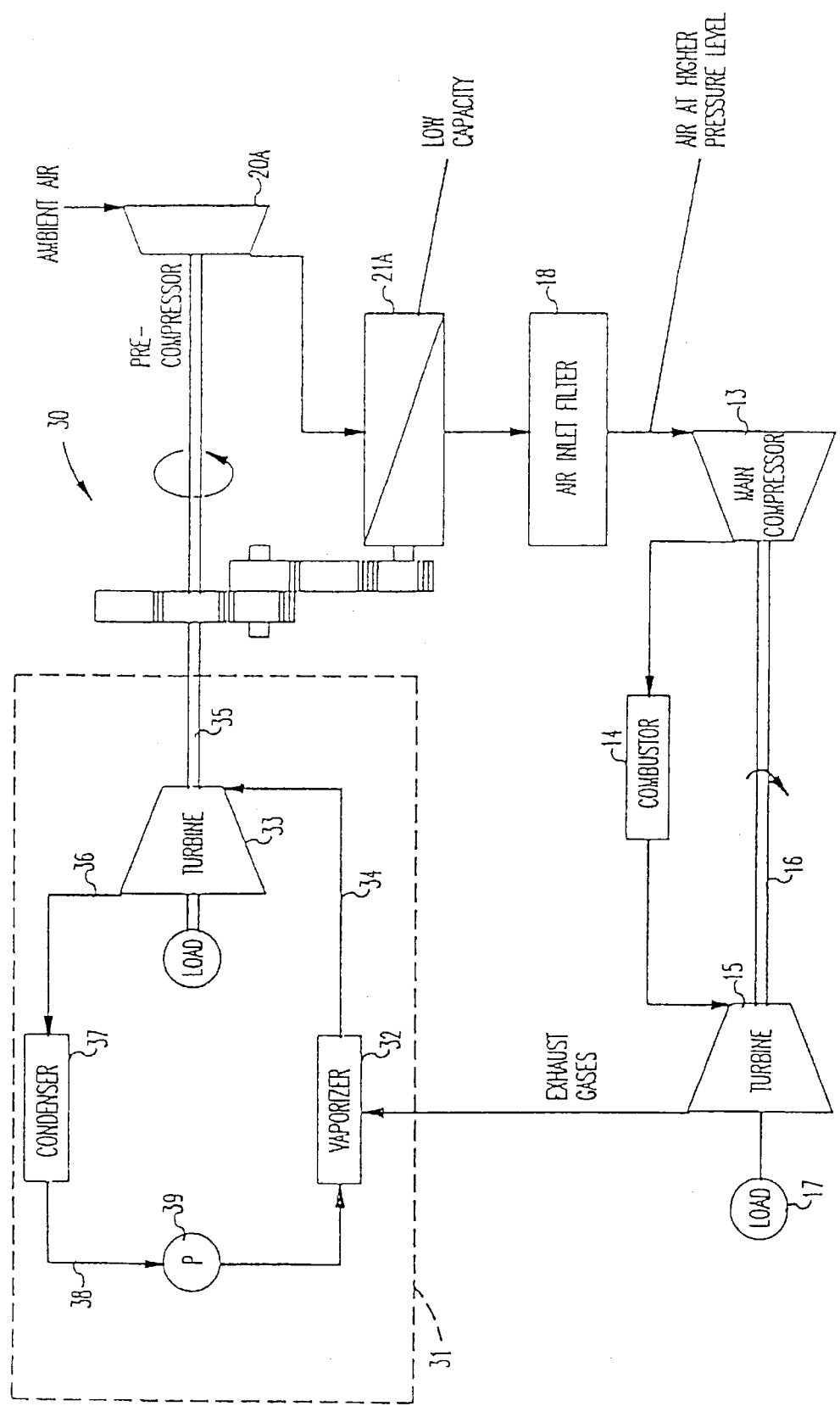
FIG. 3 is a schematic block diagram similar to FIG. 1 but showing the precompressor and low capacity cooler being operated by a steam turbine unit responsive to exhaust gases from the gas turbine.

Instead of an external electrically driven motor to drive the precompressor, the latter can be driven directly from a steam turbine unit operated by exhaust gases from the gas turbine, e.g., when a combined cycle is used wherein the main product produced by the steam turbine is electric power. Referring now to FIG. 3, power plant 30 comprises precompressor device 20A and low capacity cooler 21A similar to the corresponding components shown in FIG. 1. However, power plant 30 includes steam turbine unit 31 which includes vaporizer 32 containing water as the working fluid, and responsive to exhaust gases produced by gas turbine 15 for producing steam. The steam is applied to turbine 33 via conduit 34, the turbine being responsive to the steam for producing power and also directly driving precompressor device 20A by means of shaft 35 which directly couple the turbine to the precompressor device. The expansion of steam in turbine 33 produces work that also powers precompressor device 20A with the steam exiting the turbine at exhaust 36 after work has been produced. In addition, as shown, cooler 21A can be powered by turbine 33. However, when an evaporative cooler is used, there is no need for the cooler to be powered by turbine 33.

The steam exiting the turbine at exhaust 36 is condensed in condenser 37 producing condensate which is directed through conduit 38 to pump 39 which returns the condensate to the vaporizer thus completing the working fluid cycle. Condenser 37 is preferably air cooled, any necessary fan means (not shown) being powered usually by external motors. Directly driving precompressor device 20A, as well as cooler 21A, with turbine 33 using shaft 35, results in a reduction in both the size of a generator (indicated in FIG. 3 by load 22) associated with the turbine, as its losses.

In operation, ambient air is drawn into precompressor device 20A, which introduces a temperature and pressure rise. The air leaving precompressor device 20A passes to low capacity cooler 21A which introduces a temperature drop usually substantially close to the temperature rise introduced by precompressor device 20A. The air then passes to filter device 18 which introduces a pressure drop. As a result, the temperature of the air supplied to main compressor 13 usually will be substantially close to ambient temperature, and the pressure will be slightly above atmospheric pressure. The main compressor compresses this air, supplies it to combustor 14 where the air is heated by the combustion of fuel and supplied to turbine 15 which drives load 17. Exhaust gases from the turbine are usually presented to steam turbine unit 31. such that turbine 33 produces power and also drives precompressor device 20A and cooler 21A. Alternatively,. some of the electric power produced by turbine 33 can be made available to a conventional refrigeration system which supplies coolant to cooler 21A. When an evaporative cooler is used, turbine 33 will not run 21A, since this is unnecessary but will run precompressor.

Figure 4:
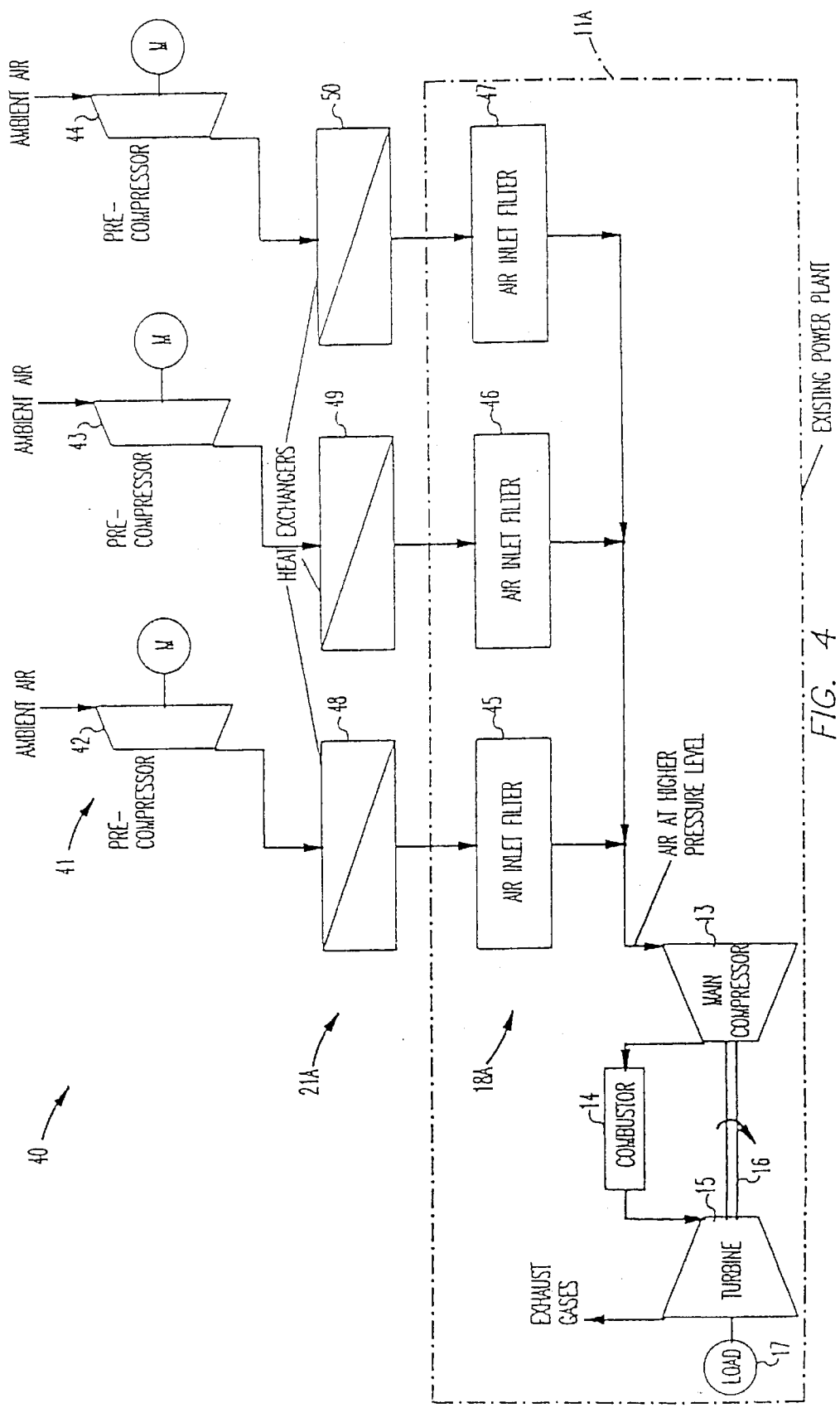
FIG. 4 is a modification of the invention showing pre-compressing and chilling occurring in parallel stages.

Embodiment 40 of the present invention shown in FIG. 4 is similar to that shown in FIG. 2 except that the precompression, and low capacity cooling, are carried out in separate units in parallel. To this end, the precompressor device is in the form of individual precompressors 41, 42, 43 that supply ambient air in parallel to filter device 18A which also comprises a plurality of individual filters 45, 46, 47 which are respectfully associated with the individual compressors. In this embodiment, low capacity cooler 21A comprises individual coolers 48, 49, 50 which are respectfully associated with the individual compressors. As in the previous embodiment, preferably, these coolers are evaporative coolers. An advantage of the arrangement shown in FIG. 4 is that the various air filters and precompressors as well as low capacity coolers can be taken on and off line individually without affecting the operation of the power plant 11A. A further advantage of such an arrangement is that it facilitates construction in that a filter for a complete power plant is a large and costly piece of equipment.

In addition, in accordance with the present invention, the embodiment shown in FIG. 4 can be used such that a combined cycle power plant using the embodiment of FIG. 4 can be included in a manner similar to that. shown and described with reference to FIGS. 1 and 3.

According to the present invention, the precompression employed produces a pressure ratio of about 1.15, and cooling is performed to reduce the temperature of the precompressed air to a temperature about that of ambient air. In contrast, in evaporative cooling and/or deep chilling without precompression, the air temperature is reduced to a level significantly below ambient temperature.

Under conditions of relatively high humidity, a system using a precompressor and a cooler in accordance with the above described embodiments of the present invention is particularly advantageous. According to the present invention, dehumidification of very humid air is not necessary; and in fact, the coefficient of performance is improved under humid conditions. In contrast, in conventional systems employing evaporative coolers and deep chillers without precompression, the cooling load may triple under humid conditions unless dehumidification is first carried out.

Under humid conditions, i.e., when the relative humidity is relatively high, cooling in accordance with the present invention will reduce the temperature of the precompressed air to a level slightly above ambient air temperature. If cost effective, however, the air will be cooled to slightly below ambient temperature. However, when a combined cycle power plant having a steam turbine is utilized, the effect of the reduced temperature of the exhaust gases produced by the gas turbine on the power produced by the steam turbine must be taken into consideration. Preferably, at locations where the relative humidity is about 80% or more, and even close to 100%, the precompressed air may be cooled to about 5° C. above ambient temperature, and at locations where the relative humidity is between 50% and 80%, the precompressed air may be cooled to about 10° C. below ambient temperature, depending on the cost effectiveness of the systems.

Furthermore, a combined cycle power plant according to the present invention, for example, as shown and described with reference to FIGS. 1 and 3, should be operated such that the heat recovery steam generation (HRSC) of the plant takes place under substantially constant conditions (particularly volume flow rate) in the face of changing ambient conditions. This can be achieved completely by controlling the level of cooling effected by the cooler (an example of means for such controlling being shown in FIG. 5) such that the temperature of the precompressed air at the outlet of the cooler, is maintained substantially constant regardless of ambient conditions. Such operation permits the design of the HRSC of a combined cycle power plant to be optimized to essentially a single point such that operation of the power plant will be close to its design level under all ambient conditions.

By comparison, a conventional combined cycle power plant is designed to operate over a range of conditions (including, for example, 30% fluctuations in air mass flow). Consequently, the HRSC in conventional combined cycle power plants is such that consideration is taken of all conditions likely to be met during the course of operation with the result that sizing and optimization is adversely affected. Thus, conventional combined cycle power plants usually will operate at off-design conditions most of the year. By constructing a combined cycle power plant in accordance with the present invention, operation will be at substantially the optimum point all year resulting in a saving of as much as 10% in the capital costs of design and construction as a result of the reduced size of the HRSC, and additional operational savings as well due to the improvement in efficiency.

Additionally, a gas turbine system according to the present invention should be operated at substantially constant conditions (particularly volume mass flow) in the face of changing ambient conditions. This can be achieved completely by controlling the level of cooling effected by the cooler (an example of means for such controlling being shown in FIG. 5) such that the temperature of the precompressed air at the outlet of the cooler is maintained substantially constant regardless of ambient conditions. Such operation permits the gas turbine system to operate at a point substantially close to design conditions such that operation of the power plant will be close to its design level under all ambient conditions.

In a further aspect of the present invention, as described in relation to FIGS. 1 and 3, the exit gases of the gas turbine system of a power plant having a precompressor device and a cooler, can be used for cogeneration (i.e., for producing steam for use as process heat) rather than being used to produce steam to run a steam turbine. In such case, in accordance with the present invention, it is advantageous to operate the system at substantially constant conditions (particularly its volume flow rate) in the face of changing ambient conditions. This can be achieved completely by controlling the level of cooling effected by the cooler such that the temperature of the precompressed air at the outlet of the cooler is maintained substantially constant regardless of ambient conditions. Such operation is particularly advantageous in cogeneration systems because the heat is part of an industrial process requiring continuous operation under constant conditions.

When gas turbines or power plants constructed in accordance with the present invention are built near natural resources of water, such as a sea, a river, or a lake, etc., or near a cooling tower and its source of cooling water, water from such source can be used as the cooling medium in the indirect cooler of the gas turbine for cooling the precompressed gases. In such case, particularly where cooling involves reducing the temperature of the precompressed gases to a temperature close to ambient temperature, a simple, indirect water-air heat exchanger with a mechanical cooler because the temperature of the water source will be below ambient air temperature.

Furthermore, when water from such water sources. is used, then the water can be used to cool the condenser of the steam turbine as well as for being used in the cooler used in conjunction with the precompressor for precompressing and cooling the air supplied to the main compressor of the gas turbine incorporated in the combined cycle power plant in accordance with the present invention. Moreover, when according to the present invention, the preferred cooler, i.e., the evaporative cooler is used in conjunction with the precompression device in a combined cycle power plant built near these sources of water, water from these sources can be used to cool the condenser of the steam turbine as well as being used in the evaporative cooler associated with the precompressor device provided that a blow down system is incorporated in the water circuiting system used for circulating water to cool the condenser of the steam turbine and the precompressed air with an evaporative cooler.

In a still further aspect of the invention, when a gas turbine or combined cycle power plant is operated according to the present invention in a humid location under the condition that the precompressed gases are cooled to a temperature. slightly below ambient temperature, water produced by the condensation of water vapor in the air as the precompressed air is cooled can be used for controlling the oxides of nitrogen in the exhaust gases by adding this water to the combustion process that takes place in the combustor of the gas turbine. Thus is made possible because the water produced has a relatively high level of purity.

The embodiments of the present invention are also effective in dry areas where particular limitations lead to a desire to avoid the use of deep chillers or evaporative coolers, e.g., a location where the availability of water resources is limited making the use of evaporative coolers costly, where water resources are polluted, etc. Furthermore, in accordance with the present invention, since often cooling is to temperatures above ambient temperatures, air coolers, i.e., heat exchangers not using a refrigeration cycle but using ambient air instead as the cooling medium can be used as the coolers in the above described embodiments.

However, the use of the preferred embodiment of the present invention shown in Figs., where precompression is used in combination with evaporative cooling after precompression has taken place permits evaporative cooling to be used even in relatively humid locations as well as in relatively dry locations. In relatively dry locations, the size of the evaporative cooler will be relatively larger compared to a system where a precompressor is not used. In conventional practice, indirect coolers are used in addition to evaporative coolers since the relative humidity even in dry locations does not permit the extensive use of evaporative coolers. By using the present invention, where precompression is performed before cooling, the size of the evaporative cooler may be increased in relatively dry areas. This is particularly advantageous since evaporative coolers are relatively simple and cheap devices compared to a chiller which otherwise would have been used if precompression was not used.

Furthermore, in n additional aspect of the present invention, the precompression produced by the precompressors in the above described embodiments can be used as well instead of a heater needed for use in cold weather. Accordingly, the precompressor increases the temperature of air at its exit so as to minimize the chance of ice forming in the main compressor. The occurrence of freezing in the precompressor is substantially avoided in accordance with the present invention by including a mechanical centrifuge drop remover. Alternatively, the entrance of the precompressor is designed to ensure that drops of water do not significantly influence the performance of. the precompressor. Furthermore, or in conjunction with both these alternatives, part of the hot precompressed air can be recirculated in order to heat the air entering the precompressor. Such an arrangement is much simpler than recirculating air extracted from a stage in the main compressor for heating air entering the main compressor.

Precompression of a pressure ratio of 1.15 and cooling in combination in accordance with the above described embodiments of the present invention provides enhanced a capacity of up to 20% at 35° C. ambient temperature. Moreover, the increased capacity is almost totally independent of weather conditions with the result that a power plant based on the present invention is cost effective in most industrialized countries where hot, humid summer conditions are the norm.

A still further aspect of the present invention relates to the electric generators. This aspect ensures that the existing cooling system of the electric generators of the gas turbine, and/or steam turbine as well, if used in a combined cycle power plant, operates at design temperature even if the ambient temperature is high (e.g., during the day when peak electricity demand occurs). This is achieved by cooling the medium used in the generator cooling system with any conventional air cooling system, e.g., an air conditioning system, thus cooling the ambient air in the vicinity of the generator. The cooling of the electric generators in this manner permits them to operate at their design conditions almost continuously thus ensuring maximum power output of the gas turbine or combined cycle power plant even during periods of peak power demand when the ambient air temperature is relatively high. This aspect of the invention is applicable to inventions or apparatus where conditions bring about operation of electric generators at temperatures higher than . the design temperatures of the generators where the higher temperatures would normally reduce the electrical output. By cooling the air surrounding the electric generator, in accordance with the invention, the output of the generator will be raised to its design level.

Figure 6:
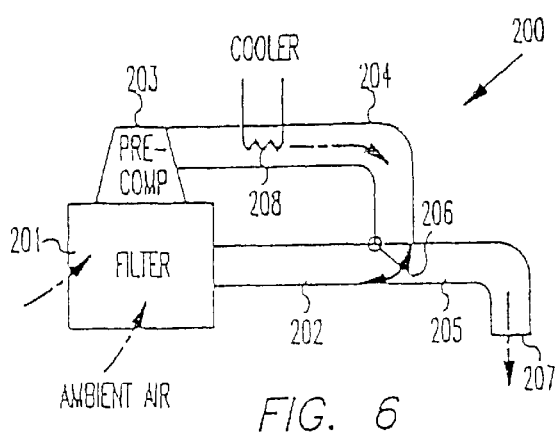
FIG. 6 is a schematic diagram of an arrangement for selectively switching in or switching out a precompressor for use with a power plant of the type described.

Precompression is often economical only under certain circumstances that depend on ambient temperature and relative humidity, and their relationship to peak demand for power. To increase the flexibility of existing power plants, retrofitting these plants particularly with precompressors may be advantageous. In such cases, arrangements like those shown in FIGS. 6 and 7 may be utilized. In FIG. 6, arrangement 200 is associated with filter 201, which is part of an existing combined cycle power plant such as that shown schematically in FIG. 1, or a part of a gas turbine such as that shown in FIG. 2. Filter 201 serves to filter ambient air before such air is supplied to the main compressor (not shown) of the power plant. Main conduit 202 connects filter 201 to the main compressor.

Precompressor 203, when operated, serves to precompress ambient air after it is filtered by the filter; and auxiliary conduit 204 is connected to conduit 202. Preferably, at junction 205 between the conduits is flapper valve 206 pivotally mounted inside one of the conduits for pivotal movement between a first position (shown in solid lines in FIG. 6) and a second position shown in broken lines. In its first position, valve 206 serves to block conduit 202 allowing air pressurized by precompressor 203 to flow to outlet 207 of the main conduit which connects to the inlet of the main compressor of the power plant. In its second position, precompressor 203 in not operational and air passing through filter 201 moves valve 206 to its second position. Thus, valve 206 serves as means for selectively connecting said auxiliary conduit to said main conduit.

In retrofitting, having flapper 206 at the end of duct 202 eliminates the need for strengthening all of the existing ducts to withstand the higher pressure produced by the precompressor. The only part of the existing duct that needs to be strengthened or rebuilt is that portion between junction 205 and the inlet of the main compressor of the gas turbine.

Preferably, cooler 208 is associated with conduit 204 for cooling the precompressed ambient air. Cooler 208 may operate on a water compression cycle, a Freon cycle, etc. Evaporative chilling is also possible depending on the circumstances. Also, the precompressor may be of the radial or axial type depending on the duct configuration.

Figure 7:
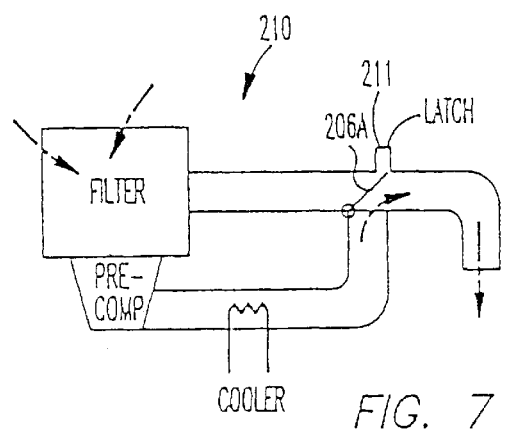
FIG. 7 is a schematic diagram of another arrangement like that shown in FIG. 6.

In arrangement 210 shown in FIG. 7, is similar to the arrangement shown in FIG. 6, but latch 211 is provided for maintaining valve 206A in its first position, i.e., the position in which precompressed air is supplied to the main compressor. Latch 211 may be electromagnetically operated, pneumatically operated, etc., and valves. 206 and 206A may be servo operated if warranted, or may be manually operated.

Figure 7A:
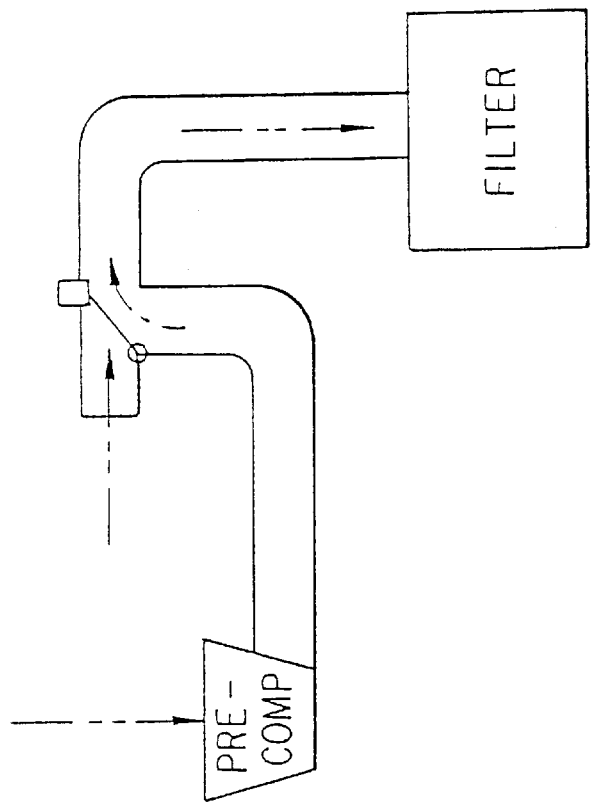
FIG. 7A is a schematic diagram of another arrangement like that shown in FIG. 7, but showing the filter in a different location.
Figure 6A:
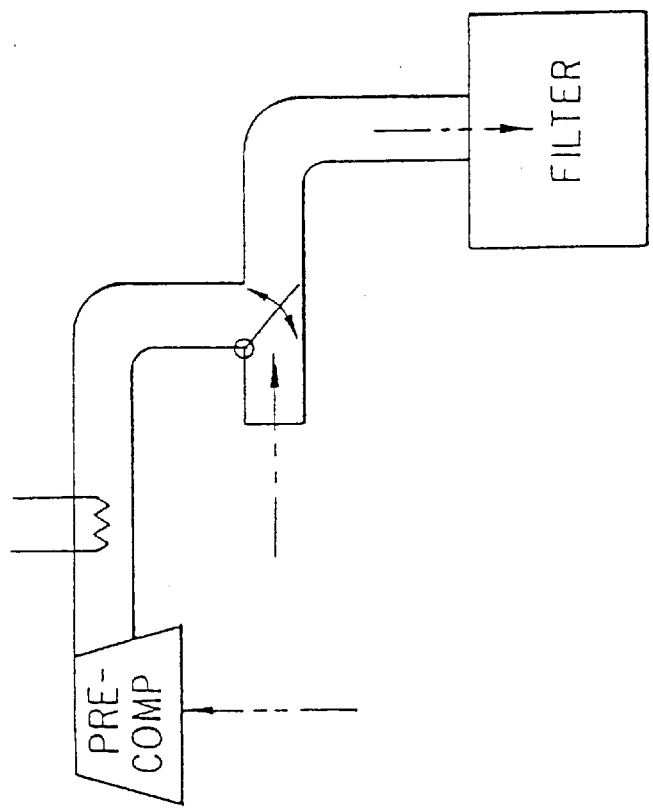
FIG. 6A is a schematic diagram of an arrangement like that shown in FIG. 6, but showing the filter in a different location.

While the embodiments of FIGS. 6 and 7 are described as retrofits, similar arrangements may be designed into new combined cycle power plants, as well as new gas turbine units as well. Furthermore, while the embodiments of FIGS. 6 and 7 disclose the use of a filter upstream of the precompressor, if preferred, the precompressor may be positioned downstream of the filter as shown in FIGS. 6A and 7A. In such a configuration, use of a radial type precompressor is preferred because the blades will be substantially insensitive to erosion due to particulate matter entrained in the ambient air.

Thus, the embodiments of FIGS. 6, 6A, 7, and 7A permit greater flexibility of operation and to permit the precompressor and its associated cooler to be bypassed during certain weather conditions, for example cold weather where the operation of the precompressor and its associated cooler do not contribute significantly, to the power output of the power plant or gas turbine unit, and in fact, may result in expending more energy than is produced by this expedient. During such situations, where the inlet air is directed through the main compressor and bypasses the precompressor and cooler, the inlet air will have to overcome a smaller pressure drop so that even more power can be produced. Finally, if the operation of the precompressor is not needed, it may be operated merely to overcome the pressure drop of the filter as well as its associated cooler.

The present retrofit system not only provides an improved system but also enables the conventional design and existing installations to be integrated into the precompressor systems described above. Furthermore, since the embodiments of FIGS. 6, 6A, 7, and 7A include means for bypassing the precompressor systems, these embodiments permit existing ducts to be utilized and to use the precompressor in such a manner that takes full advantage of the existing ducts in combination of the alternative flow patterns provided by both radial and axial precompressors.

Figure 8:
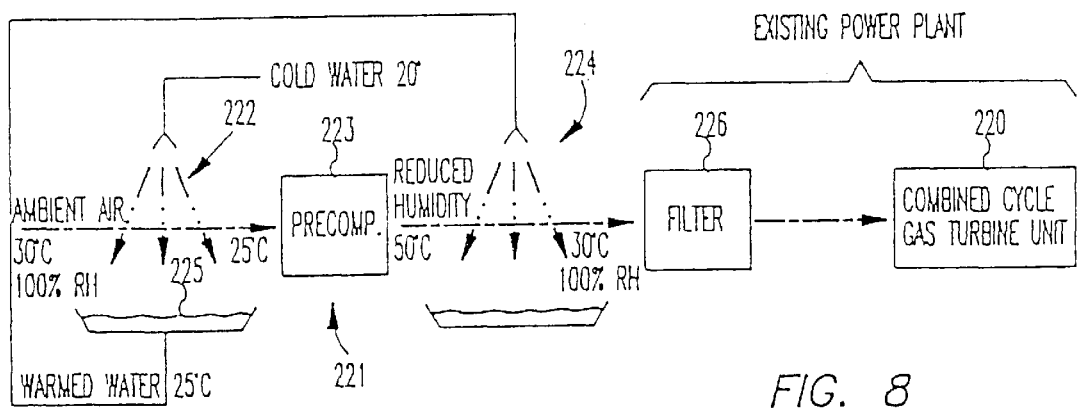
FIG. 8 is a schematic block diagram of an embodiment of the present invention.

FIG. 8 shows a further embodiment of the present invention which may be a new system or a retrofit of existing power plant 220 with the present invention. indicated by reference numeral 221 when the plant operates over long periods of time under conditions of high relative humidity (close to substantially saturated ambient air). Plant 220 comprises a main compressor for compressing ambient air supplied to the compressor to produce compressed air, a combustor for heating the compressed air and producing hot gases, and a gas turbine responsive to said hot gases for driving said main compressor and supplying a load, and for producing hot exhaust gases, all as shown schematically in FIG. 1.

Apparatus 221, according to the invention, includes direct contact heat exchanger 222 for contacting and cooling close to substantially saturated air with cooler water for producing cooler air and warmed water. The water may come form local sources such as a lake, river, or even the sea. Sensible and latent heat is absorbed by the cooler water from the air resulting in a cooling of the air and the heating of the water thus extracting condensate from the air without any significant change in relative humidity. The water may be sprayed into the ambient air upstream of precompressor device 223 which serves to compress the cooled air to produce pressurized air that is warmer than ambient air and has a lower relative humidity.

For example, saturated ambient air at about 30° C. will be cooled to about 25° C. when directly contacted with water at about 20° C. After its precompression, the pressurized air will have a temperature of about 40° C. with a reduced humidity by reason of its elevated temperature.

Evaporative cooler 224, downstream of precompressor 223, cools the warmed pressurized air to produce cooled pressurized air at about ambient air temperature and relative humidity. Cooler 224 is supplied with a portion of warmed water 225 produced by heat exchanger 222; and the cooled pressurized air is applied to filter 226 associated with power plant 220. Preferably, precompressor device 223 is constructed and arranged so that the pressure rise introduced thereby is at least greater than the pressure drop introduced by filter 226.

The embodiment of FIG. 8 discloses a combined cycle power plant which is conventionally operated as a base load power plant operating virtually continuously during a 24 hour period, and thus during both on and off peak periods. However, if preferred, precompression system 223, including its associated coolers 222 and 224 can be operated only during on-peak periods. Alternatively, the precompression system and its associated coolers can be operated continuously. Furthermore, the precompression system can be operated in conjunction with a stand-alone peaking gas turbine unit if preferred. In addition, the embodiment of FIG. 8 can be used in any of the other embodiments hereindescribed.

Figure 9:
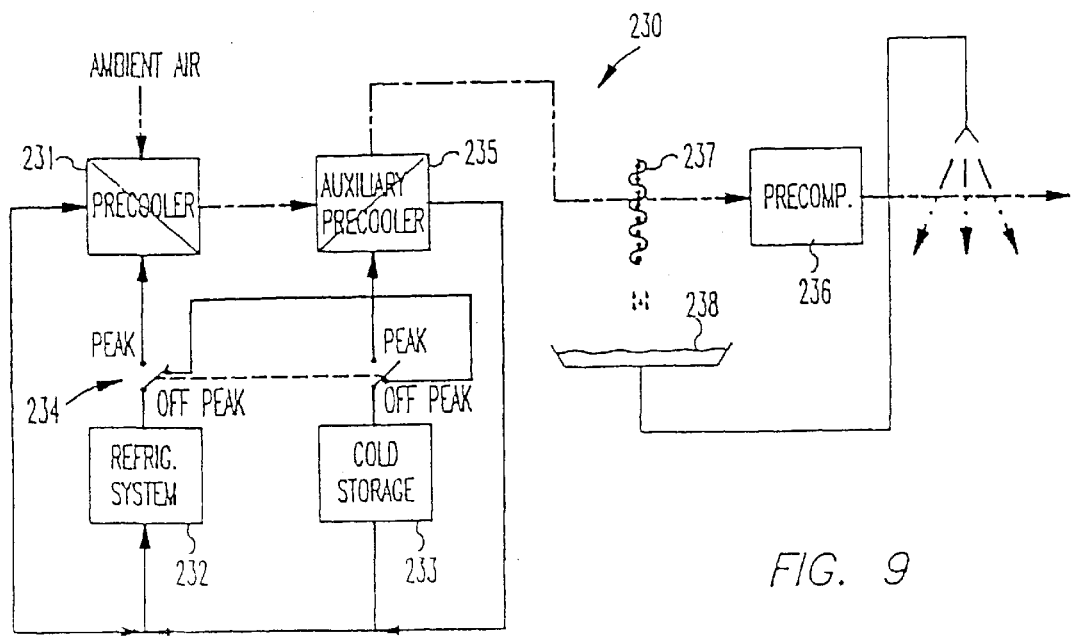
FIG. 9 is a schematic block diagram of another embodiment of the present invention.

FIG. 9 shows an arrangement designed for peaking a power plant of the type described. Such plant (not shown) includes a main compressor for compressing ambient air supplied to the compressor to produce compressed air, a combustor for heating the compressed air and producing hot gases, and a gas turbine responsive to said hot gases for driving said main compressor and supplying a load, and for producing hot exhaust gases or even a combined cycle power plant during on-peak hours.

Arrangement 230 of FIG. 9 comprises indirect heat exchanger or precooler 231 for passing ambient air, and refrigeration system 232 operable to supply coolant to heat exchanger 231 during periods of peak demand. Refrigeration system 232 may operate on at water compression cycle, or a Freon cycle or other cycle.

Arrangement 230 also includes cold storage means 233, and means 234 for selectively switching the coolant produced by refrigeration system 232 to cold storage means 233 during time of off-peak demand. Conduits provided constitute means for connecting cold storage means 233 to precooler 231 during periods of peak demand.

In operation, during off peak periods, means 234 are connected as shown in FIG. 9. Precooler 231 is thus inoperative, and ambient air passes directly, via a bypass duct, to the main compressor of the gas turbine without being pressurized or cooled. Refrigeration system 232 is operating, however, and coolant is delivered to cold storage means 233 for the purpose of cooling stored water, or making ice.

When peak demand occurs, means 234 are switched allowing cold water from storage 233 to be supplied to cooler 231 for cooling the inlet air. Coolant from the refrigeration system also enters precooler 231 to provide sufficient cooling to cool ambient air before it is supplied to precompressor 236.

The specific humidity of the air exiting precooler 231 will be reduced as compared to the specific humidity of ambient air by reason of the cooling of the air. The result will be condensate which can be collected by mist collector screen 237, or other means, interposed between precooler 231 and precompressor 236. Screen 237 thus serves as means for separating condensate in the air passing from the auxiliary precooler to the precompressor particularly when the ambient air has a relatively high humidity.

Preferably, condensate 238 is piped to spray head 239 which sprays the condensate into the air leaving the precompressor thus cooling the air by evaporation of water or evaporative cooling. Spray head 239 thus constitutes means for directly contacting air precompressed by the precompressor with the condensate and before the precompressed air is supplied to the main compressor.

While the above described embodiment discloses the use of cold storage for on-peak cooling and precompression, a system can include, if preferred, merely cooling system 232 for use during on-peak periods. In such case, the cooling system may comprise a refrigeration system of even an indirect cooling system using local water sources such as water from a lake, river, or even sea water, or other water if preferred. Actually, however, cooling and precompression can be carried out when needed or preferred. This is also true for all embodiments of the present invention.

Figure 10:
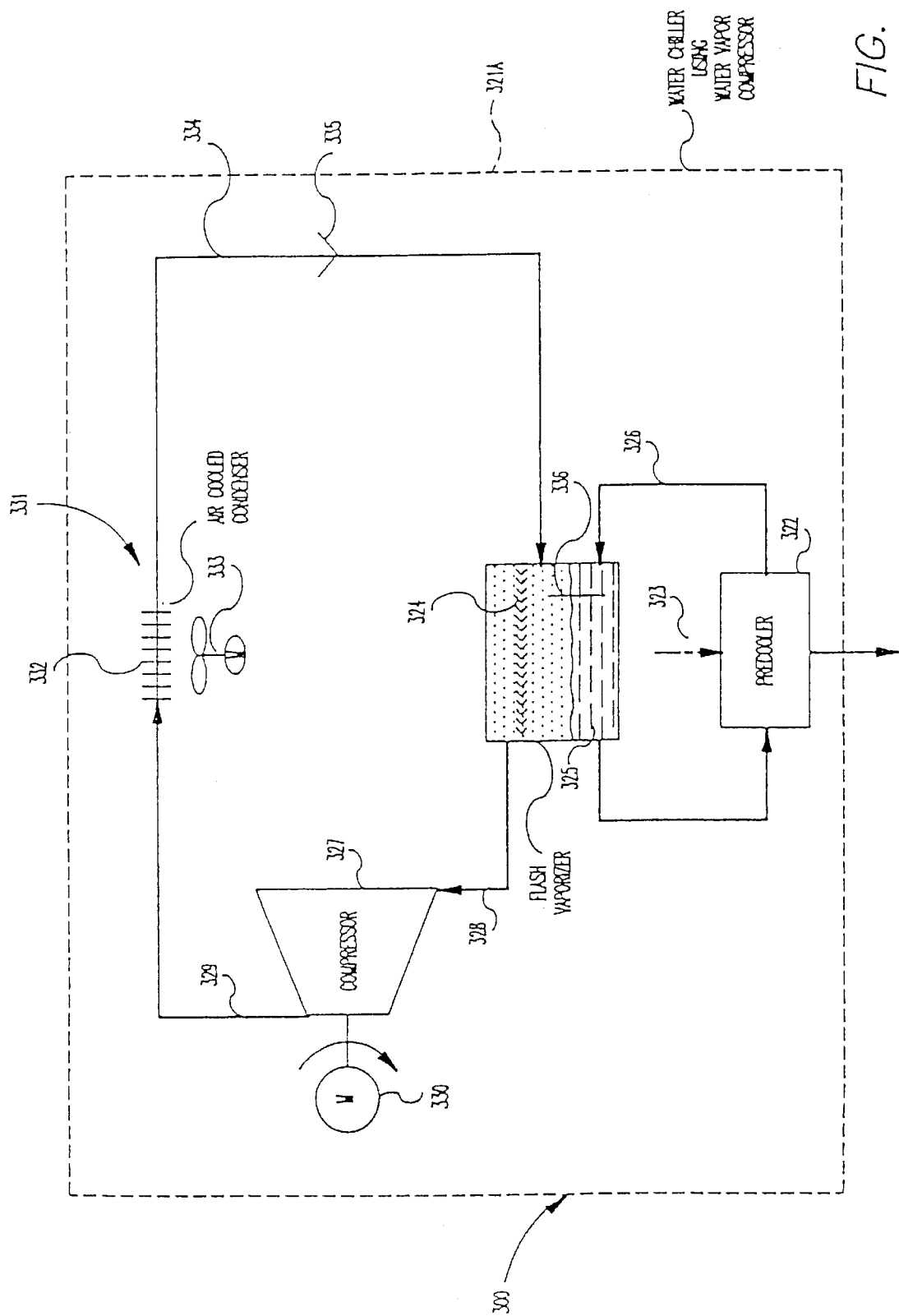
FIG. 10 is a schematic representation of a water chiller using a water vapor compressor in connection with the embodiment of the invention shown in FIG. 9.

Cooling system 232 may take the form shown in FIG. 10 wherein water in flash vaporizer 325 flashes into steam which is compressed in compressor 327 driven by motor 330 producing heated compressed steam that is applied to finned tubes 332 of air cooled condenser 331. Motor 333 supplies cool air to the tubes and the steam condenses but remains at at high pressure. Expansion of the water through valve 335 produces cold vapor that is returned to chamber 325. The result is that cold water in the flash chamber is circulated through pipes 326 into precooler 322. Ambient air at 323 enters the precooler as described in connection with FIG. 9 and is cooled thereby.

In another embodiment of the present invention, a portion of the pressurized gas from the main compressor, or the steam turbine can be used as a source of cooling for cooling water or making ice during off-peak periods. In such case, the relatively high pressure air exiting the main compressor is allowed to expand and is cooled in the process. The air cooled in this manner can be used for producing ice or cold water.

In a still further embodiment, the motors used to drive the precompressors or compressor in cooling systems can be separate motors, and us electricity produced by the combined cycle power plant generator, or even an organic Rankine cycle turbine or power plant. In addition, when the present invention is used in conjunction with a combined cycle power plant, the same source of water can be used for the precooling cooling after precompression, and for water used for cooling the condenser of the steam turbine when a water cooled condenser is used with the steam turbine. Finally, fresh water produced by desalination units from brackish water, or water coming from agricultural or industrial waste water, can be used as the source of water for the cooling systems used in the present invention such as the evaporative cooler.

Furthermore, the present invention preferably includes a control system for optimizing the operational sequence of the precompression system for achieving optimum output of the combined cycle power plant or gas turbine.

Figure 11:
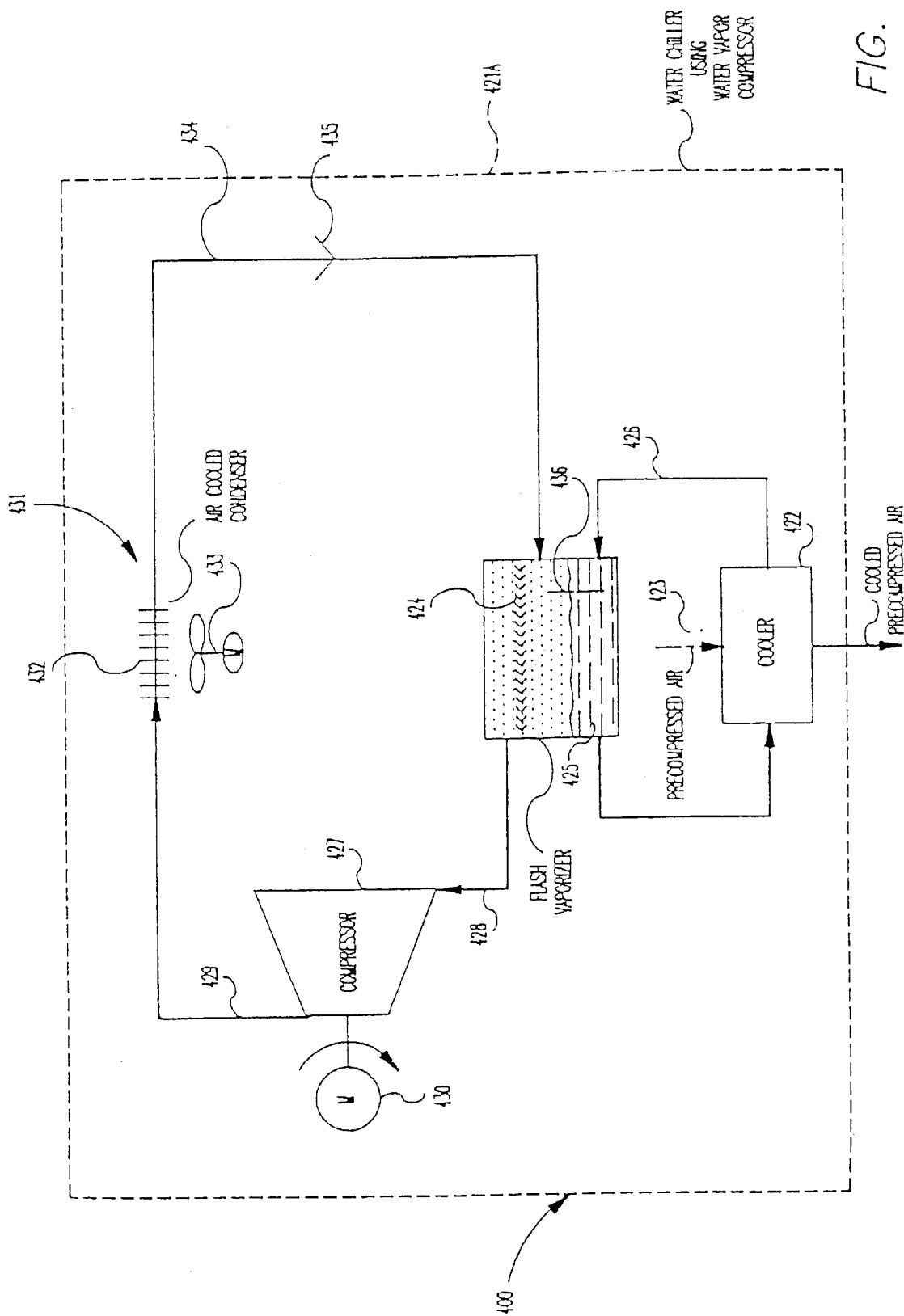
FIG. 11 is a schematic representation of the invention similar to FIG. 10 but showing pre-compressed air being supplied to the cooler instead of ambient air.
Figure 12:
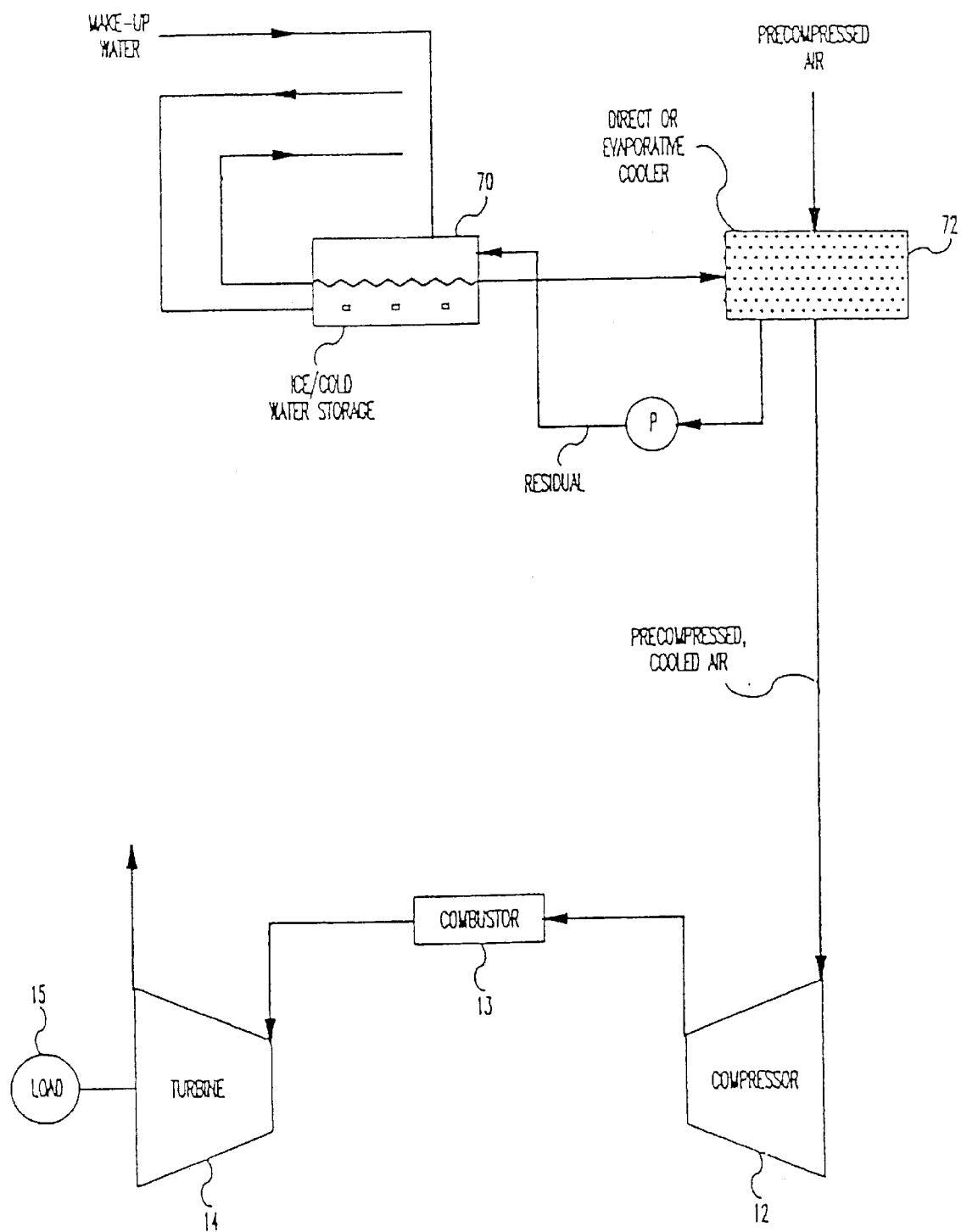
FIG. 12 is a schematic representation of the invention showing pre-compressed air cooled by direct or evaporative cooling in association with ice/cold water storage.
Figure 13:
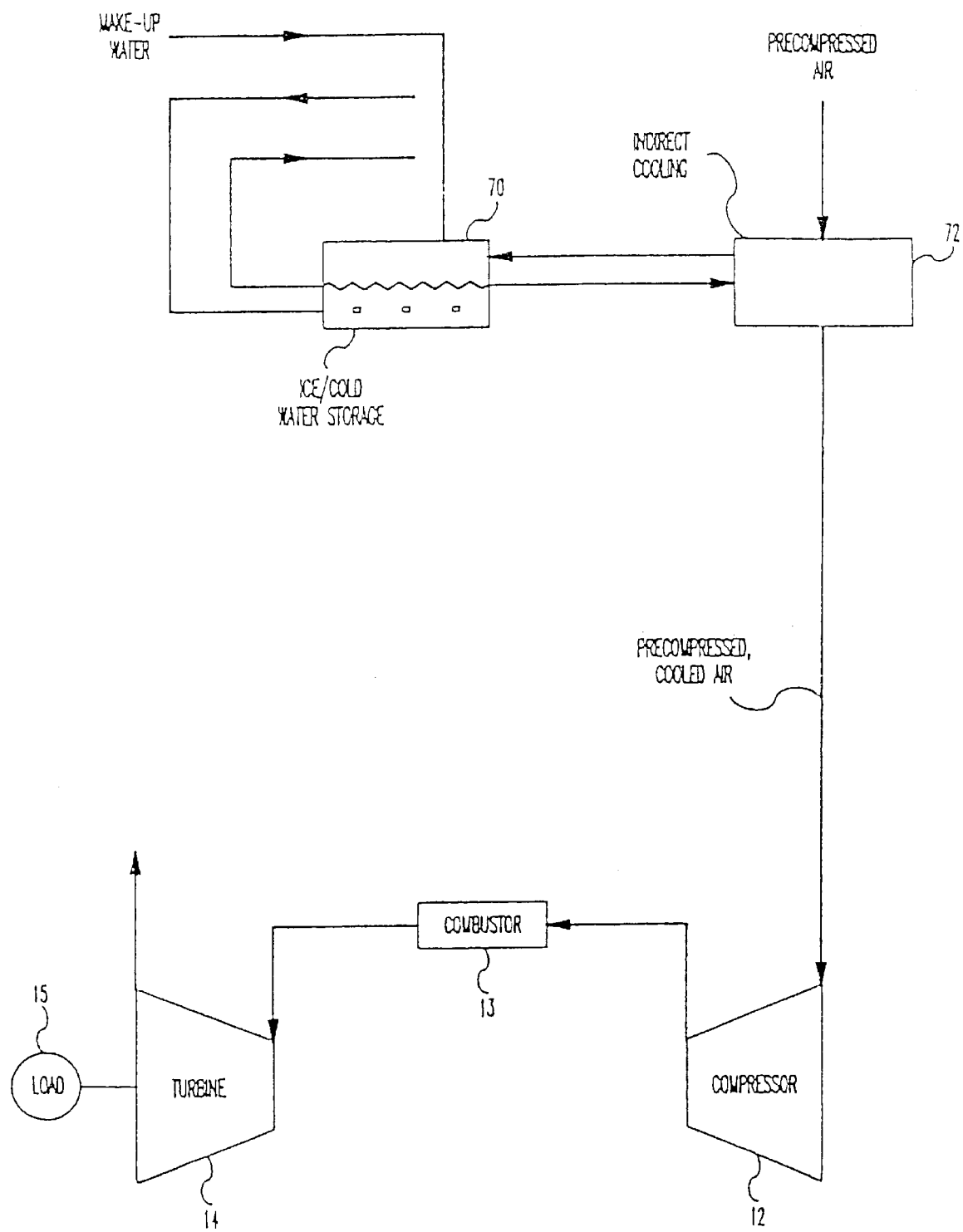
FIG. 13 is a schematic representation of the invention showing pre-compressed air cooled by indirect cooling in association with ice/cold water storage.
Figure 14:
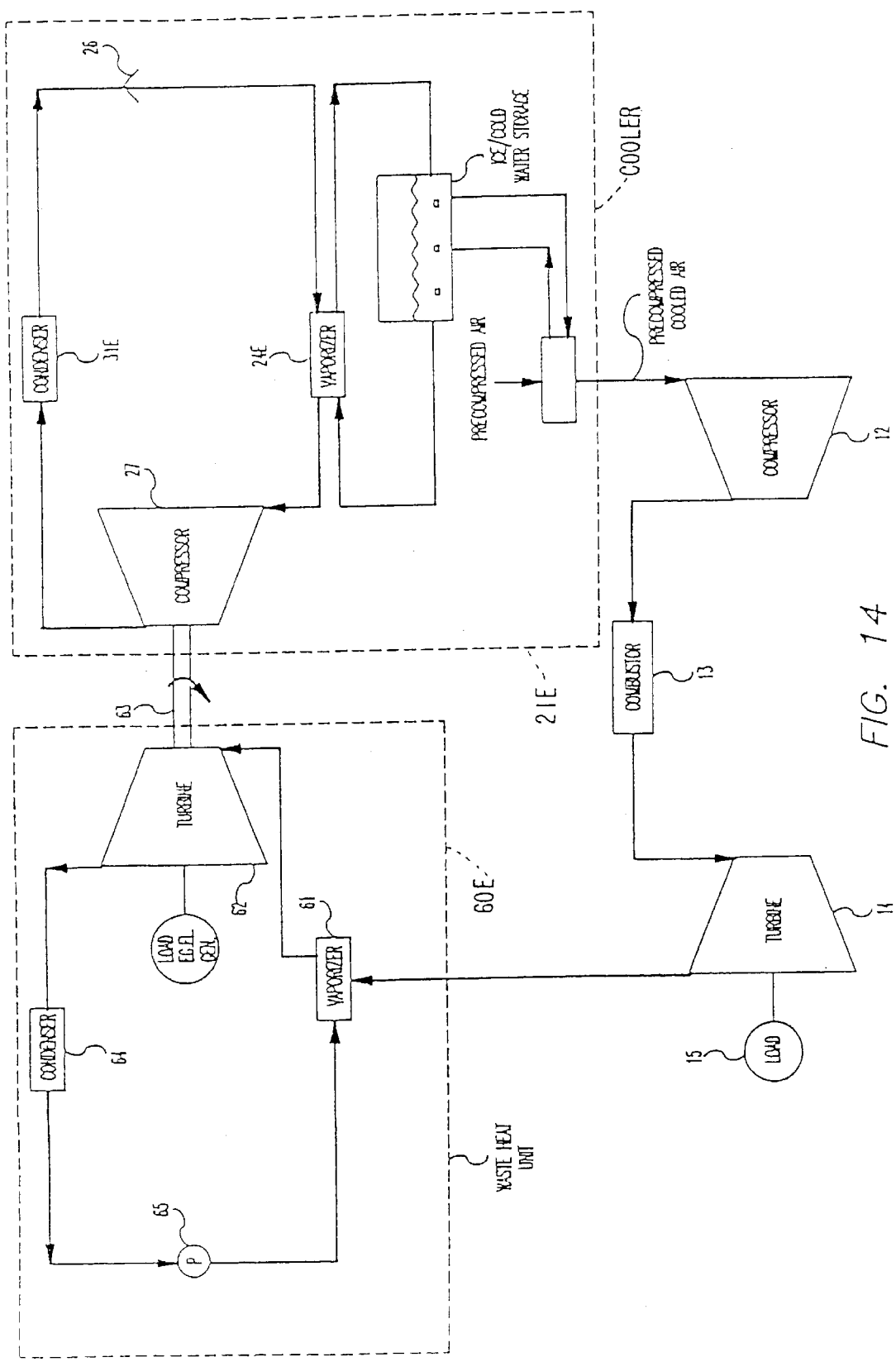
FIG. 14 is a further embodiment of the invention showing pre-compressed air cooled by indirect cooling in association with ice/cold water storage.

Furthermore, in accordance with the present invention, coolers 112, 21, 21A, 4S, 49 and 50 shown in FIGS. 1 to 4, the cooler shown in FIG. 5, cooler 208 shown in FIG. 6, the coolers shown in FIGS. 6A, 7 and 7A, can take the form of that shown in FIG. 11. In addition, off-peak ice storage, examples of which are shown in FIGS. 12, 13 and 14, can be used to cool the precompressed air.

Figure 15:
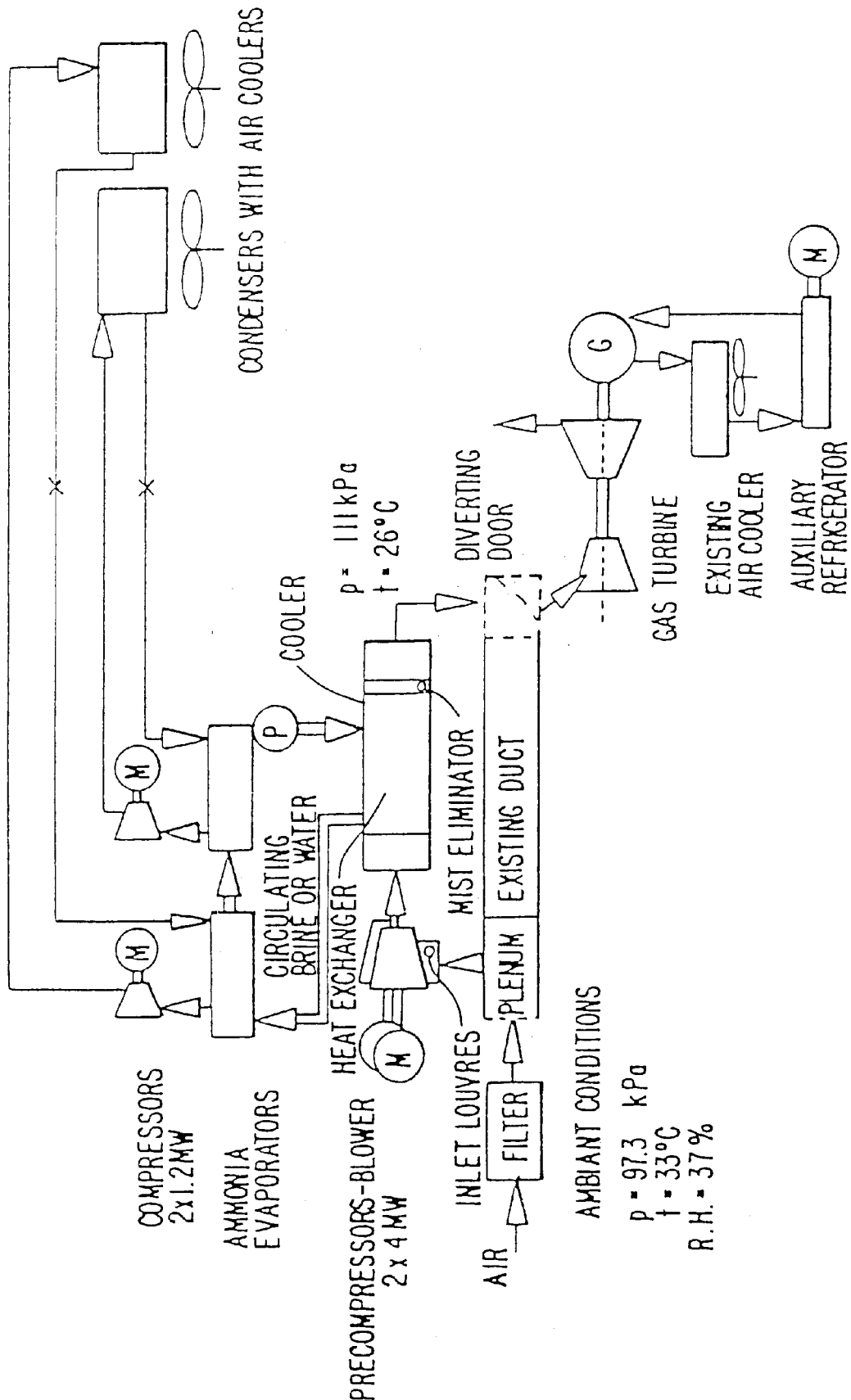
FIG. 15 is a further embodiment of the invention showing pre-compressed air cooled by indirect cooling in association with a mechanical refrigeration system.

Additionally, if preferred, a secondary heat transfer cycle using a heat transfer medium can be used for transferring heat from the precompressed air to a cooling or coolant medium evaporator (e.g., ammonia) with the heat transfer medium being circulated back to the precompressed air for cooling the precompressed air (see e.g., FIG. 15). Water, brine or other suitable fluids, can be used as the heat transfer medium. By using this arrangement, a safer system is achieved because the cooling or coolant medium is remote from the vicinity of the precompressed air which flows into the main compressor and combustion chamber of the gas turbine.

Moreover, in addition to. the previously described cooling methods for cooling the precompressed air, other options exist as well. For. example, a small refrigeration or coolant unit can be used in conjunction with an evaporative cooling unit for cooling the precompressed air (see e.g., FIG. 16A). Here, in the example, the small refrigeration or coolant unit cools the water to be used for evaporative cooling. In a further option, the precompressed air can be cooled indirectly by water which is cooled by an evaporative cooling tower as well as by an evaporator of refrigeration or coolant cycle (see e.g., FIG. 16B). Furthermore, in another option, a refrigeration cycle can be used for producing ice or cold water storage during off-peak hours with water or brine being circulated from the ice or cold water storage to the precompressed air for cooling the precompressed air (see e.g., FIG. 16C). In a still further option, river or water from an available water source can be used in conjunction with a refrigeration or coolant cycle for cooling the precompressed air (see e.g., FIG. 16D). In this option, the river or other water is cooled by the refrigeration or coolant cycle before it is used for cooling the precompressed air.

The disclosed precompression cycles enable such cooling systems to be used effectively because the relatively higher temperature level of the precompressed air permits a smaller cooling load to be used, a better coefficient of performance to be achieved, and permits the use of warmer sources.

Furthermore, while the above description refers to gas turbines and combined cycle power plants containing gas turbines, in accordance with the present invention, gasified or pyrolyzed fuel such as gasified coal, etc., as an alternative fuel to gaseous fuel such as natural gas, distillate fuel, etc., can be used as a fuel for operating the gas turbines.

Furthermore, if the compressed air of the gas turbine is externally heated, the present invention, in all its embodiments, can be used to precompress the air supplied to the main compressor of the gas turbine.

The advantages and improved results furnished by the method and apparatus of the present invention are apparent from the foregoing description of the preferred embodiment of the invention. Various changes and modifications may be made without departing from the spirit and scope for the invention as described in the appended claims.

What is claimed:

1. Apparatus for augmenting power produced by a gas turbine comprising:

a) a precompressor having a pressure ratio of about 1:1.15 that precompresses ambient air prior to supplying it to a compressor of the gas turbine;when the temperature of the ambient air exceeds the design level thereby introducing temperature and pressure rises in the air supplied to the compressor of the gas turbine;

b) a direct cooler that directly cools precompressed air exiting the precompressor using water supplied thereto to a temperature approximately ambient air temperature; and c) a valve that supplies cooled, precompressed air to the inlet of the compressor of the gas turbine when required and otherwise supplies ambient air to the inlet of the compressor of the gas turbine.

2. Apparatus according to claim 1 wherein said valve is positioned in an auxiliary conduit such that cooled, precompressed air is supplied to the compressor of the gas turbine when required and otherwise ambient air is supplied to the inlet of the compressor of the gas turbine.

3. Apparatus according to claim 2 wherein said auxiliary conduit is constructed and arranged such that said valve connects a auxiliary conduit to the main conduit of the compressor of the gas turbine.

4. Apparatus according to claim 1 wherein said direct cooler evaporates water into the precompressed air.

* * * * *